US012750007B2

(12) United States Patent
Needham et al.

(10) Patent No.: US 12,750,007 B2
(45) Date of Patent: Sep. 29, 2026

(54) AERODYNAMIC DAMPING STOW FOR SOLAR TRACKER SYSTEMS

(71) Applicant: FCX Solar LLC, Mont Vernon, NH (US)

(72) Inventors: Christopher Thomas Needham, Mountain View, HI (US); Frank Carl Oudheusden, Mont Vernon, NH (US)

(73) Assignee: FCX Solar LLC, Mont Vernon, NH (US)

( * ) Notice: Subject to any disclaimer, the term of this patent is extended or adjusted under 35 U.S.C. 154(b) by 324 days.

(21) Appl. No.: 18/736,462

(22) Filed: Jun. 6, 2024

(65) Prior Publication Data

US 2025/0379545 A1 Dec. 11, 2025

(51) Int. Cl.

| | |
|---|---|
| ***H02S 50/10*** | (2014.01) |
| ***G01M 9/02*** | (2006.01) |
| ***H02S 20/32*** | (2014.01) |

(52) U.S. Cl.

CPC ............... *H02S 50/10* (2014.12); *G01M 9/02* (2013.01); *H02S 20/32* (2014.12)

(58) Field of Classification Search

CPC ........... H02S 50/10; H02S 20/32; G01M 9/02
See application file for complete search history.

(56) References Cited

U.S. PATENT DOCUMENTS

2022/0129018 A1 * 4/2022 Needham ................ H02S 50/10

* cited by examiner

*Primary Examiner* — Thomas M Hammond, III
(74) *Attorney, Agent, or Firm* — Ashurst Perkins Coie LLP; Colin Fowler; Ben Brokesh

(57) ABSTRACT

Stowing flexible tracker systems with the panel surfaces at a negative tilt angle during high wind is enhanced through optimizing around total system damping in order to address aerodynamic instabilities. Current flexible tracker designs function by avoiding the regions in which negative aerodynamic damping primarily occurs. Doing so requires them to stow at maximum absolute tilts to remain stable. However, methods disclosed here select system flexibility, system mechanical damping, and tracker stow angles to achieve a positive aerodynamic damping function and thus enable stable wind stow at lower than maximum tilt angles. The design approach addresses multiple current failure modes within the PV tracker industry while reducing installation cost relative to current designs.

20 Claims, 8 Drawing Sheets

AERODYNAMIC DAMPING STOW FOR SOLAR TRACKER SYSTEMS

BACKGROUND

Photovoltaic (PV) power systems frequently track the sun to various degrees to increase an amount of energy produced by the system. These trackers typically move photovoltaic modules to adjust an angle of incidence of the sunlight on the surface of the PV modules. In particular, trackers typically rotate the PV modules around an axis principally oriented north to south, tilting the modules to as much as 60 degrees towards the east and west and adjusting tilt within this range throughout the day. By tracking the position of the sun, PV power systems often produce 20-30% more energy than fixed-tilt systems.

A common configuration of horizontal single-axis trackers ("SAT") as described above includes a single actuator near the center of a row of PV modules, potentially with 80-120 modules tilted by a single actuator. The angle of tilt is defined by the position of the actuator, while a torque tube or other similar device transfers moments and positions the rest of the row at the tilt of the actuator. However, environmental loading (wind, snow, dead load, etc.) can twist portions of a row away from the intended tilt angle. These types of solar trackers are referred to as "flexible" within the industry in comparison to types that use an actuator on sufficient points along a solar tracker row to constrain maximum twist to less than 10 degrees delta measured along a given row under maximum wind loading at various angles of tilt. Solar trackers that exhibit meaningful twisting under wind loading require that both static and dynamic impacts be considered through wind tunnel testing. The combination of static and dynamic wind loading results in a total system wind loading. The twisting is typical of other types of flexible structures that deform under wind loading and is well studied in the industry through aeroelastic wind tunnel testing and related simulation modeling.

The prevailing technique for mitigating environmental load is through a high angle stow position with minimal damping of the solar tracker. A high angle stow position refers to positioning the panel more vertically than horizontally. The high angle stow reduces the potential of high dynamic wind loading.

When a new PV system project is developed, the system is tested in a wind tunnel to optimize the cost of components of the system as a function of the projected output of the system. Wind tunnel tests are either static or aeroelastic/dynamic.

DETAILED DESCRIPTION

Figure 1A:
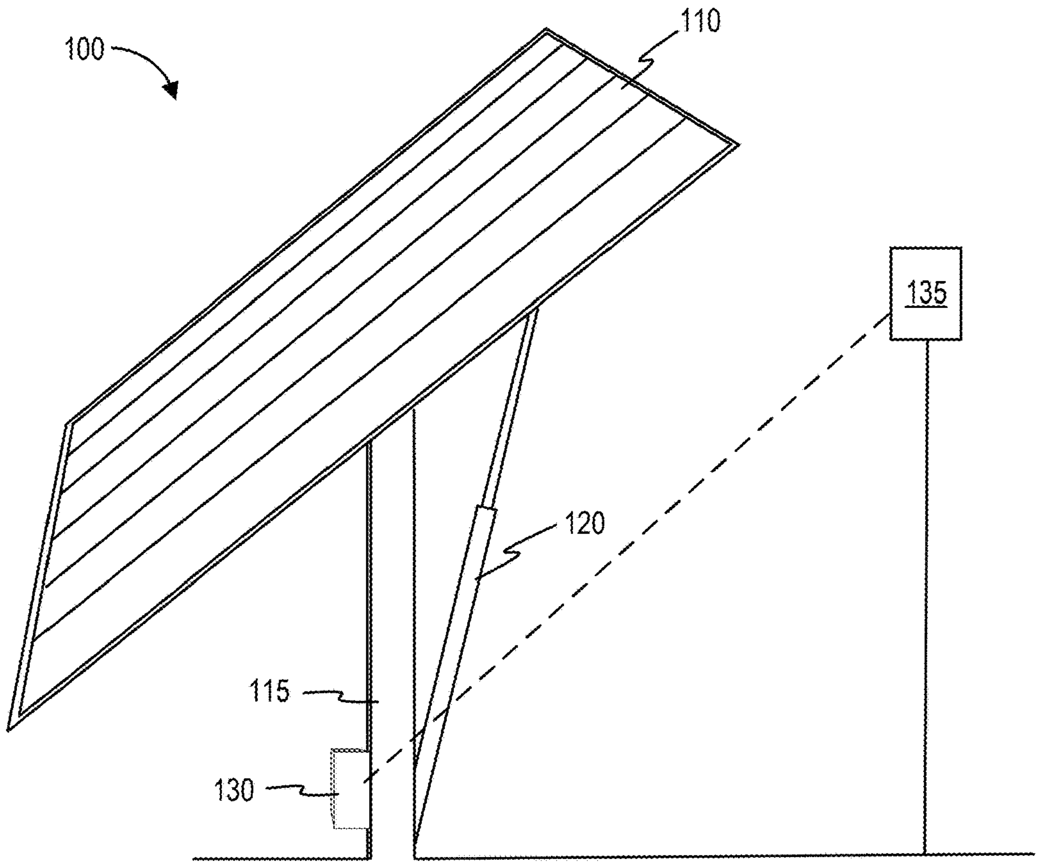
FIG. 1A illustrates a photovoltaic system.

Disclosed herein are techniques to identify and design flexible PV tracker systems for stow angles or a range of stow angles that achieve positive aerodynamic damping. Employing stow angles that achieve positive aerodynamic damping enables engineers to reduce reliance on mechanical damping of the system.

Flexible PV systems generally rely on as few actuators as possible (actuators are comparatively expensive parts). The ratio of actuators to panels is lower than in non-flexible systems. Non-flexible systems use more actuators in place of damping; however, the additional actuators increase the overall cost of the system.

For purposes of this disclosure a "flexible" solar tracker system is one subject to sufficient deflection as to require aeroelastic consideration. 10 degrees of absolute twist is a typical cut-off for when a static wind tunnel test report may be used without specific aeroelastic testing added in. However, the selection of 10 degrees of absolute twist is subjective on the part of the wind tunnel test facilities and allows for a buffer between when aeroelastic effects begin to dominate. Flexible tracker systems allow for deflection requiring aeroelastic consideration due to a relative lack of points of fixity along each row. Actuators generally act as points of fixity. Rows that have few (or a single) actuator or other point of fixity per panel/module are flexible.

"Critical damping" is an effect that may be achieved on the level of the solar tracker half-row (i.e., a "wing"). However, small sections of a few panels may oscillate far from the damper locations on such a row. These small oscillations do not drive the overall oscillation behavior of the entire wing and can be safely ignored.

For the purposes of this disclosure, "high damping" refers to more than 25% of critical damping, and "very high damping" refers to 100% of critical damping or greater (e.g., being overdamped). High damping is a relative term based on the context upon which damping is applied. A number of known systems do not use greater than 25% damping, thus damping greater than the prevailing systems is considered high. A system with high damping, but less than critical damping will eventually reach equilibrium, though will allow for oscillation. An overdamped system reaches equilibrium, as does critical damping, but after a longer period of time (and similarly without oscillation). "Infinite" damping refers to a fixed position.

Solar trackers typically operate with a wind stow configuration during design wind conditions. The wind stow tilt angle is the intended angle as positioned by the actuators, not considering twisting of portions of the row away from the actuator or other points of fixity. Each row only has one wind stow angle at a given time as defined by the actuator positioning. Stowing with the panel top surfaces facing into the wind such that the windward (leading) edge of the row chord is lower than the trailing edge of the row chord is referred to as a negative angle of attack or "negative tilt angle". Stowing with the panel top surfaces facing away from the wind such that the windward (leading) edge of the row chord is higher than the trailing edge of the row chord is referred to as a positive angle of attack or "positive tilt angle".

Solar tracker rows are typically identified as being perimeter or interior, although additional classifications exist. Perimeter rows are rows on the East and West edges of an array such that other rows are only adjacent to only one side of the perimeter row. Interior rows are rows where another row is adjacent on both East and West sides such that some shielding of wind for both East and West wind directions is realized by the row.

Many tracker systems on the market today are designed with the use of both static and dynamic wind tunnel testing of models to determine total wind loading on the system. Static wind tunnel testing assumes no movement of the tracker rows and is most appropriate for determining normal pressure loading for component design. Dynamic wind loading considers critical system properties such as torsional flexibility, modal shapes, and mechanical damping. It is most appropriate to determine torsional loading of flexible tracker systems. The results of dynamic wind tunnel testing are sometimes represented as either separate dynamic wind pressure coefficients or dynamic amplification factors that are to be added to or multiplied by static pressure coefficients, respectively. The terms static and dynamic refer to the test models and not the nature of the airflow around the structure. In both cases, the flow around the tracker structure is highly turbulent and variable such that it is never purely static. Additionally, the motion of the tracker row itself makes flexible tracking systems particularly susceptible to torsional instabilities.

The current method of validating aerodynamic torsional stability within the single-axis PV tracker industry is by defining a bound of tilt ranges by which the tracker does not twist away from the intended stow angle under wind loading. The validation is primarily done through dynamic wind tunnel testing. For example, one industry definition is that the tracker does not vary more than 20 degrees around the intended stow angle under wind loading. That definition of variance from stow is typically evaluated specifically for the wind stow position and maximum design wind loading for a project. The definition of stability does not preclude oscillation within this twist range. A tracker stowed at a horizontal 0-degrees tilt angle but rotating plus or minus 10 degrees at a frequency of 1 hz for a multitude of cycles, would therefore meet the condition of being torsionally stable. The context of the definition comes in an industry that currently has tracker products that can see 120-degree ranges of twisting during torsional instabilities and so has been a reasonable benchmark of current practices. Torsional stability does not mean minimal or zero torsional motion.

The features of flexible PV tracker rows to be resistant to or susceptible to torsional instabilities can be described as either positive or negative aerodynamic damping. Positive aerodynamic damping occurs when an airflow over an oscillating, oblong body provides an alternating opposition force that pushes the oblong body toward a stable position within the range of motion. Conversely, negative aerodynamic damping occurs when the airflow pushes the oblong body into a greater twist.

More specifically, positive aerodynamic damping requires at least two different aerodynamic factors that each create a torsional loading on the tracker row and work in opposition such that one increases in magnitude and the other decreases in magnitude while the tracker row twists away from the intended stow angle under wind loading. These two, or more, aerodynamic factors may sum to zero moment at some tilt angle or they may not, as the tracker structure itself provides the deficit through twisting. What is important is that the increase and decrease in these aerodynamic factors act to reduce torsional motion of the tracker row in order to provide positive aerodynamic damping.

Negative aerodynamic damping occurs primarily when the sum of all significant aerodynamic torsional factors increases or decreases in magnitude with rotational motion such that the tracker row twists further away from the intended stow angle over the full range of expected twist ranges. There is typically a hysteresis impact over the full range of rotational motion. The hysteresis impact requires that torsional instability is primarily addressed through the mechanical damping of structural elements that experience rotation under wind loading. Mechanical damping is well understood in the industry to include design elements such as dampers, friction in bushings, and various smaller effects. Total damping of a solar tracker row is principally the combination of mechanical and aerodynamic damping. Flexible solar trackers currently experience negative aerodynamic damping at wind stow angles lower than their maximum absolute tracking angle.

When flexible tracker rows are stowed flat or at a positive tilt angle, wind loading is generally higher on the windward edge of the panels than the trailing edge, tending to rotate the panels away from the wind further. This is primarily due to two different factors of wind loading on the tracker row. The first factor is that the top of the solar tracker row is exposed to less obstructed airflow than the bottom of the row. The second factor is the tendency for the center of pressure of wind loading to occur toward the windward side of the row chord for flat plate structures. These two factors of aerodynamic loading combine to create torsional loads around the tracker axis of rotation that always tend to increase rotation away from horizontal. Furthermore, both factors are affected by non-linear aeroelastic considerations such as alternating flow attachment and separation from the panel surfaces that further drive instabilities. This makes the tracker rows experience negative aerodynamic damping. These factors work together over all positive tilt angles and so aerodynamic damping is expected to be negative over the full range of motion experienced.

Because aerodynamic damping for these systems is negative, the system will demonstrate torsional oscillation under wind loading that can rapidly progress into structural failure if additional damping is not included in the design. Because of the risk posed by negative aerodynamic damping, the primary system damping to resist increasing motion under wind must come from mechanical damping such as bushing friction or external dampers. Designing around high reliance in mechanical damping brings increased complexity, system cost, and risk of component failures. The aerodynamic effects described tend to decrease their impact at high tilt and the resulting negative aerodynamic damping effect reduces as well. This is the reason why many trackers on the market today stow at their maximum tilt angles, even though they must add material cost to handle increased lateral loading.

FIG. 1A illustrates a flexible photovoltaic (PV) system 100, according to some embodiments. As shown in FIG. 1A, the PV system 100 may include a PV panel 110, an actuator 120, and a controller 130. The PV system 100 is configured to generate electricity and may be used alone or with other similar photovoltaic systems in, for example, a photovoltaic power station.

The PV panel 110 includes an array of one or more photovoltaic modules configured to convert solar energy into electricity by the photovoltaic effect. The PV panel 110 is rotatably anchored to a base 115, and may be coupled to a power grid, battery, or other power transmission or storage system to output energy captured by the PV panel 110. The amount of electricity produced by each photovoltaic module can be a function of at least the angle of incidence of light on the surface of the module, where more energy is captured when light is perpendicular to the surface (i.e., a zero-degree angle of incidence) than when light is incident at higher angles. Each PV panels are not directly connected to other panels, the positioning of one panel is insulated from the positioning of other panels.

The actuator 120 is configured to rotate the PV panel 110 around one or more axes. The actuator 120 may be a linear actuator coupled to the PV panel 110 and a fixed position, such as the base 115. Increasing or decreasing the length of the linear actuator changes a tilt angle of the PV panel 110 with respect to the base 115. Other types of actuators may be used in other embodiments. For example, the PV panel 110 may be mounted on an axle and a rotary actuator may drive the axle to rotate the PV panel 110 around an axis. In one embodiment, the actuator 120 rotates the PV panel 110 around an axis centered at the base 115 and geographically oriented substantially north to south, such that a surface of the PV panel 110 can be tilted between east- and west-facing angles. The actuator 120 may also rotate the PV panel 110 around additional axes (e.g., an east-west axis), or the photovoltaic system 100 may include one or more additional actuators to cause other movements of the PV panel 110.

The controller 130 generates drive signals that cause the actuator 120 to set a tilt angle of the PV panel 110. To increase the amount of energy captured by the PV panel 110, the controller 130 may set the tilt angle based on a position of the sun. In one embodiment, the controller 130 is coupled to a light sensor (not shown in FIG. 1) to detect a position of the sun during the day. As the day progresses, the controller 130 may drive the actuator 120 to move the PV panel 110 to follow the detected movement of the sun. Thus, the controller 130 drives the actuator 120 to move the PV panel 110 from an orientation facing substantially east to an orientation facing substantially west. Overnight, the controller 130 may drive the actuator 120 to return the PV panel 110 to an east-facing orientation in preparation for sunrise the next morning, or the controller 130 may drive the actuator 120 to rotate the PV panel 110 in response to detecting sunlight in the east. The controller 130 may alternatively control the tilt angle of the PV panel 110 without light feedback, for example based on time of day.

In addition to controlling the actuator to implement daily sun-tracking rotations of the PV panel 110, the controller 130 can generate drive signals that cause the actuator 120 to adaptively stow the PV panel 110 relative to a wind direction. The controller 130 can be communicatively coupled by wired or wireless communication to a wind direction sensor 135, such as an anemometer, force sensors measuring incident wind, force or strain sensors measuring directions of forces applied to the PV panel 110, or any other device capable of detecting the wind direction. As shown in FIG. 1A, the wind direction sensor 135 can be a standalone device positioned near the PV panel 110, but other implementations of the wind direction sensor 135 can be physically coupled to the PV panel 110 or the base 115 or positioned differently with respect to the PV panel 110. In some embodiments, in a given PV array, wind direction sensors 135 are positioned throughout the array and provide granular detection of the direction and/or strength of the wind experienced by panels local to each sensor. Furthermore, multiple wind direction sensors 135, whether the same type or different, can be communicatively coupled to the controller 130, and the sensor(s) 135 can be placed at different locations physically coupled to or near the PV panel 110. Based on the wind direction received from the wind direction sensor 135, the controller 130 generates a control signal to cause the actuator 120 to set a stow position of the PV panel 110.

Additionally, sensors 135 such as anemometers, accelerometers, snow detection sensors, stress/strain sensors, on-site security cameras, irradiance sensors, soiling measurement sensors, humidity sensors, temperature sensors and any other sensor that observes on site environmental conditions may be placed throughout a PV panel array to detect environmental differences such as wind or temperature within the array. In some embodiments, any combination of the sensors may be selected. The sensors selected can depend on the overall weather and climate of the region of the PV panel array. For example, an array placed within a desert would benefit more from including anemometers, humidity sensors, and temperature sensors and less so from including snow detection sensors. The data collected from the sensors can be used to provide an accurate picture of the environmental status of the overall PV array and the differing microclimates within the PV array.

The controller 130 can also be used to generate drive signals that cause the actuator 120 to adaptively stow an individual or a portion of PV panel(s) 110 within a PV array. Multiple sensors 135 communicatively coupled to the controller 130 can be placed throughout the array to acquire this data. Based on the information received, the controller 130 will generate control signals to cause individual actuators to set various stow positions for PV panels within the array. In some embodiments, individual actuators set stow positions for multiple panels simultaneously.

The controller 130 can be used to adaptively change the stow position or tilt the individual panels 110 and/or a portion of the PV array due to being shielded by other parts of the array because of their relative positions. The controller 130 and sensors 135 also can also be used to change the stow position of PV Panel 110 based on localized weather effect, microclimate or physical feature of a local environment of the PV array acquired from the environmental condition sensors 135 placed within the PV array or PV array construction configuration. In some embodiments, using wind speed data collected from the sensors positioned within the PV array, the controller 130 generates a control signal for to the actuator 120 in response to high-speed wind conditions.

In some embodiments, where the PV array is located on flat terrain, different sections of the array assume differing stow positions. Those panels on an exterior rim of the PV array provide some wind shielding to the panels on the interior of the array. Accordingly, wind forces experienced on the interior of the array may not be as severe and less extreme stow positions are implemented on the interior than the exterior of the array. Identification of array position may be based on either of initial array controller parameters, or through adaptation to granular sensor data on wind strength throughout the array (e.g., both from the interior and the exterior). In some embodiments, panels on the exterior are positioned reverse to the incoming wind. In this way, the exterior panels cause additional wind resistance and therefore shielding for interior panels.

In another example, where the PV array is positioned within bowl-shaped terrain another set of differing stow positions are implemented. Based on either of initial array controller parameters regarding panel positioning relative to terrain or through adaptation to granular sensor data on wind strength throughout the array, an array controller implements preconfigured stow states that have either steeper or shallower stow angles. Stow states are influenced by wind tunnel testing and identify positions of the array to mitigate the combined effects of the uneven terrain and wind conditions.

The set of preconfigured stow states are positioned about a first axis. The term "first axis" is defined as the axis of rotation of a single axis tracking system. In most configurations, the first axis runs predominantly north-south (e.g., so as to track the sun from east-west). The preconfigured positions are incrementally positioned about the first axis, directly correspond to a direction of the incoming wind force originating from a 180-degree arc about the first axis and on a horizontal plane.

In another example, a PV array is positioned alongside the slope of an incline. For example, the array is arranged where the panels at the top of the arrangement shield the lower panels from winds going down the incline. As such, the panels located at the top of the array are preconfigured to have steeper stow angles to better combat and shield against high-speed winds coming down the incline. In some embodiments, the lower panels provide less shielding to the higher panels, so each panel needs to be able to effectively stow against winds blowing up the slope.

In another example, a PV array includes of two panels positioned east-west in the same array. In some embodiments, the panel on the east side will tilt eastward to face a strong gust of wind blowing from the east. Simultaneously, the panel on the west side will tilt westward to face a strong gust of wind blowing from the west. The panels, both in different stow positions simultaneously, are angled to shield the other panel from winds coming from their respective directions.

In some embodiments, the preconfigured stow states include states that are fully rotated about the first axis toward either direction in addition to multiple stow states that fall as intermediate steps between each fully rotated state. The intermediate stow states enable each PV panel to respond more quickly to fast-changing winds.

The controller 130 includes any of computer software and hardware to execute the software, special-purpose hardware, or other components to implement the functionality described herein. For example, the controller can include programmable circuitry (e.g., one or more microprocessors), can be programmed with software and/or firmware, can be implemented entirely in special-purpose hardwired (i.e., non-programmable) circuitry, or can include a combination or such forms. Special-purpose circuitry can be in the form of, for example, one or more application-specific integrated circuits (ASICs), programmable logic devices (PLDs), field-programmable gate arrays (FPGAs), etc.

Figure 1B:
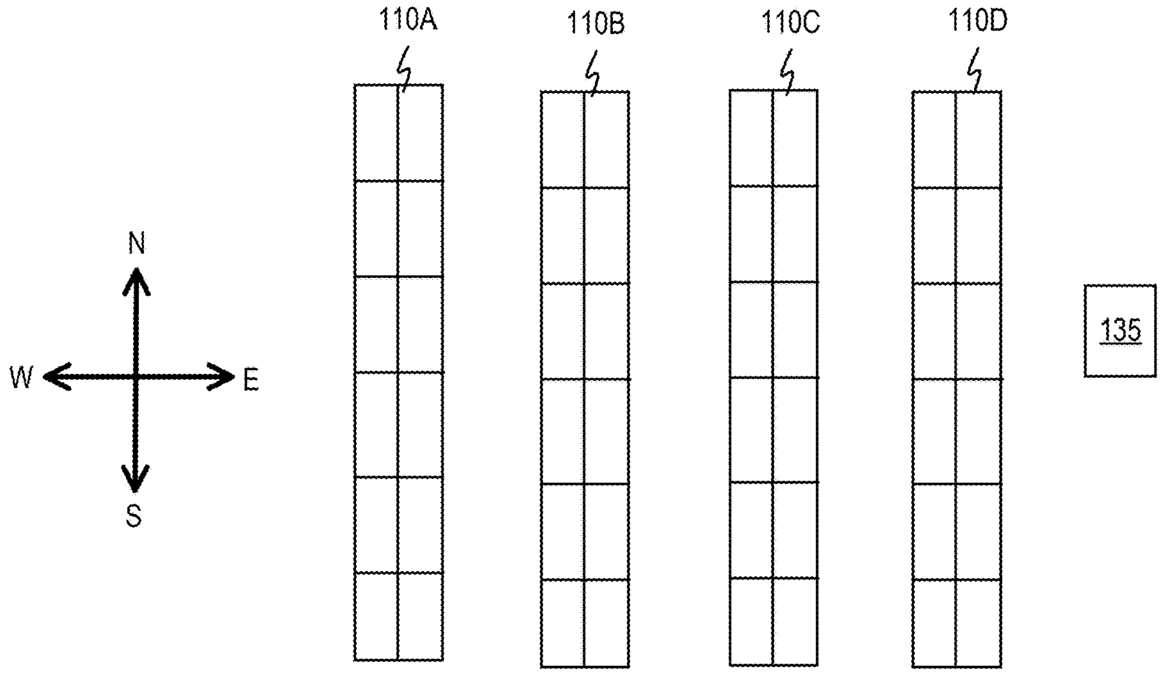
FIG. 1B illustrates a top view of a portion of an example photovoltaic power plant.

The PV panel 110 can be one of many similar panels in a photovoltaic power plant. FIG. 1B is a top view of a portion of an example PV power plant, with multiple panels 110A aligned such that they can tilt from an east-facing direction to a west-facing direction. One or more wind direction sensors 135 can be communicatively coupled to the controllers driving each PV panel 110.

Low damping (e.g., 10-15% of critical damping, less than 25%) is not sufficient to prevent torsional galloping or flutter on flexible solar tracker systems stowed at a low tilt angle under a design wind load. Dynamic loads propagate along a torque tube and cause galloping events that cause damage to the array. Thus, typically, high angle stow (e.g., 60 degrees) is used to prevent galloping events. High angle stows may cause additional stresses to the system under static loads. Stowing flat was the industry standard until development of flexible tracker systems, since low angles are the best way to combat key static loads at high wind speeds. However, recent advancements to string length (e.g., the number of panels wired in series) have led to problematic aeroelastic behaviors for low angle stowing under dynamic stresses. Long strings (e.g., greater than 20 panels) are more flexible and more prone to torsional galloping and other effects.

Described herein are wind tunnel testing methods used in the design of a flexible tracker system that employs positive aerodynamic damping. Examples of total system damping factors include: component dampers, aerodynamic damping, damping due to friction, damping due to material strain, etc.

Common design practice to address dynamic loading is to perform wind tunnel testing with panel angles set at a high tilt angle under design wind loading (ex: >=20 degrees from horizontal) to largely mitigate the hysteresis effects of flow separation. However, operation at high tilt angles can increase other types of measured pressures and thus cost when wind tunnel test results are applied to the design of a solar tracker system. In particular, static wind tunnel testing of solar tracker structures set at a high tilt will show significant increases in pressures measured. Thus, there is a trade-off inherent in optimizing wind stow tilt angles for flexible solar tracker structures when considering both static and dynamic wind load testing.

Solar tracker systems developed to date show a response time of rotation on the order of 1 s or faster. The time of rotation is a function of the natural frequency (0.5~1.5 hz for 1$^{st}$ order row rotation) and low total system damping. For this reason, the wind tunnel testing methods employed currently are easily separated into "dynamic" (aeroelastic methods) and "static" (rigid model methods) of wind tunnel testing. These two very different types of testing are then combined to determine a total system wind loading that can be considered to be the combination of a baseline static contribution and an additional dynamic wind loading effect. Up until the point of critical damping, total wind loading will not be less than a static wind loading test evaluated on a fully deformed structure and to a building code standard wind gust (for example 3s gust from IBC/ASCE 7).

Wind tunnel testing of flexible solar trackers and their scale models at a low stow angle (ex: <20 degrees from horizontal) under a design wind loading can show significant aeroelastic behaviors when solar tracker systems exhibiting typical damping ratios below 15% are evaluated. These behaviors are commonly referred to as torsional galloping, stall flutter, divergence, and buffeting. The primary cause of torsional galloping or stall flutter behaviors is a hysteresis effect in flow attachment and separation that adds inertial energy to the rotating panel assembly under wind loading when trackers are wind tunnel tested at low stow angles. The low total damping common on these systems does not mitigate the energy gain on each cycle and thus aeroelastic behaviors are observed to increase. The whole of aeroelastic wind loading behaviors described is frequently referred to as "dynamic" wind loading. Common design practice to address dynamic loading is to perform wind tunnel testing with panel angles set at a high tilt angle under design wind loading (ex: >20 degrees from horizontal) to largely mitigate the hysteresis effects of flow separation. However, high tilt angles can increase other types of measured pressures and thus system cost when wind tunnel test results are applied to the design of a solar tracker system.

Wind tunnel testing of highly damped solar tracker models (greater than 25% or greater than 100% critical damping) makes it possible to mitigate the majority of undesired aeroelastic behaviors when tracker systems are stowed at a low tilt angle under design wind loads. Undesired aeroelastic behaviors are mitigated because the energy dissipated by the total system damping can equal or exceed the hysteresis effect of flow separation experienced over a given oscillation. Meaningful reductions in dynamic wind loading are measured with aeroelastic wind tunnel testing and analysis, up to approximately the point of critical total system damping.

By increasing total system damping of a wind tunnel tested PV tracker system model above critical, it is possible to dramatically lower the 1$^{st}$ order damped natural frequency of the system such that the time to respond to a wind load is greater than the modeled building code wind gust duration time. By doing so, aeroelastic wind tunnel testing methods and related analysis will show that longer effective gust durations are required for the modeled system to achieve maximum deflections. As wind tunnel testing in a boundary layer implicates a turbulence intensity that matches that of the atmospheric boundary later, test model response rates greater than the shortest equivalent gust durations will result in lower deflections than for solar tracker system models with less than critical total system damping. This approach will result in a total wind loading (static+dynamic) than can be lower on critical system components than if the system was evaluated solely with a static wind tunnel test on a fully deformed structure for a building code standard wind gust duration. Lower total wind loading on the modeled system will result in reduced costs and increased reliability of full-scale PV system installations.

In some embodiments, the wind tunnel testing indicates a threshold of wind speed the PV tracker system enters the stow state. Embodiments described herein mitigate the effects of wind loading on a photovoltaic system by implementing stow angles with positive aerodynamic damping.

Aerodynamic Damping

The method disclosed shows how to design flexible solar tracker rows to achieve a positive aerodynamic damping function and high total damping by selecting appropriate torsional flexibility, mechanical damping, and wind stow angle. This technique is primarily of benefit to interior rows where shielding from direct wind is provided by the perimeter rows. However, perimeter rows stowed in this way will still benefit from the design approach if designed and evaluated appropriately. As interior rows make up the majority of a tracker project layout, the invention mechanism described here is predominately focused on their design.

Figure 2:
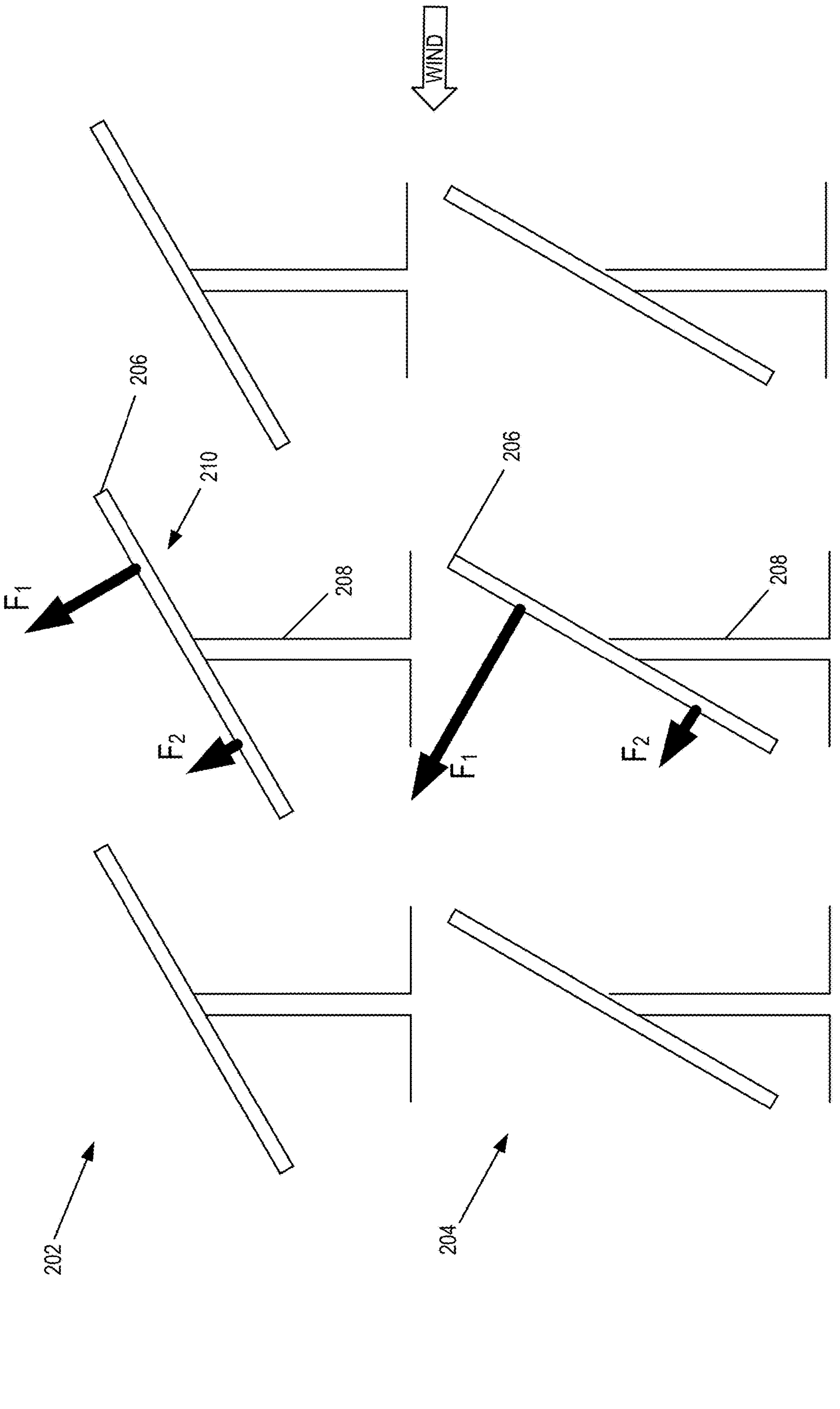
FIG. 2 is a diagram illustrating negative aerodynamic damping of panels with a positive windward tilt angle.

FIG. 2 is a diagram illustrating negative aerodynamic damping of panels with a positive windward tilt angle. Negative aerodynamic damping occurs primarily when the sum of all significant aerodynamic torsional factors increases or decreases in magnitude with rotational motion such that the tracker row twists further away from the intended stow angle over the full range of expected twist ranges. There is typically a hysteresis impact over the full range of rotational motion. The hysteresis impact requires that torsional instability is primarily addressed through the mechanical damping of structural elements that experience rotation under wind loading.

Depicted is a row segment 202 at a low positive tilt and the row segment 204 at a high positive tilt. Force indicators are applied to either side of a panel 206 about a base 208. The windward side 210 experiences the greatest amount of force, and relenting to that force (e.g., shifting to a greater positive tilt), causes an increase in force experienced by that, windward side 210. The difference in relative forces causes the panel 206 to twist further potentially causing damage to the system.

Notably, at a positive windward tilt, the back of the panel 206 receives the force of the wind. Bolts that secure the PV panel 206 to a frame are frequently driven in one direction—aligned with the front of the PV panel 206. Thus, wind stress at the backside of the panel 206 pushes on the securing bolts in a way that wind stress on the frontside of the panel 206 does not. Wind stress on the backside of the panel may lead to the panel 206 tearing off of the frame.

Figure 3:
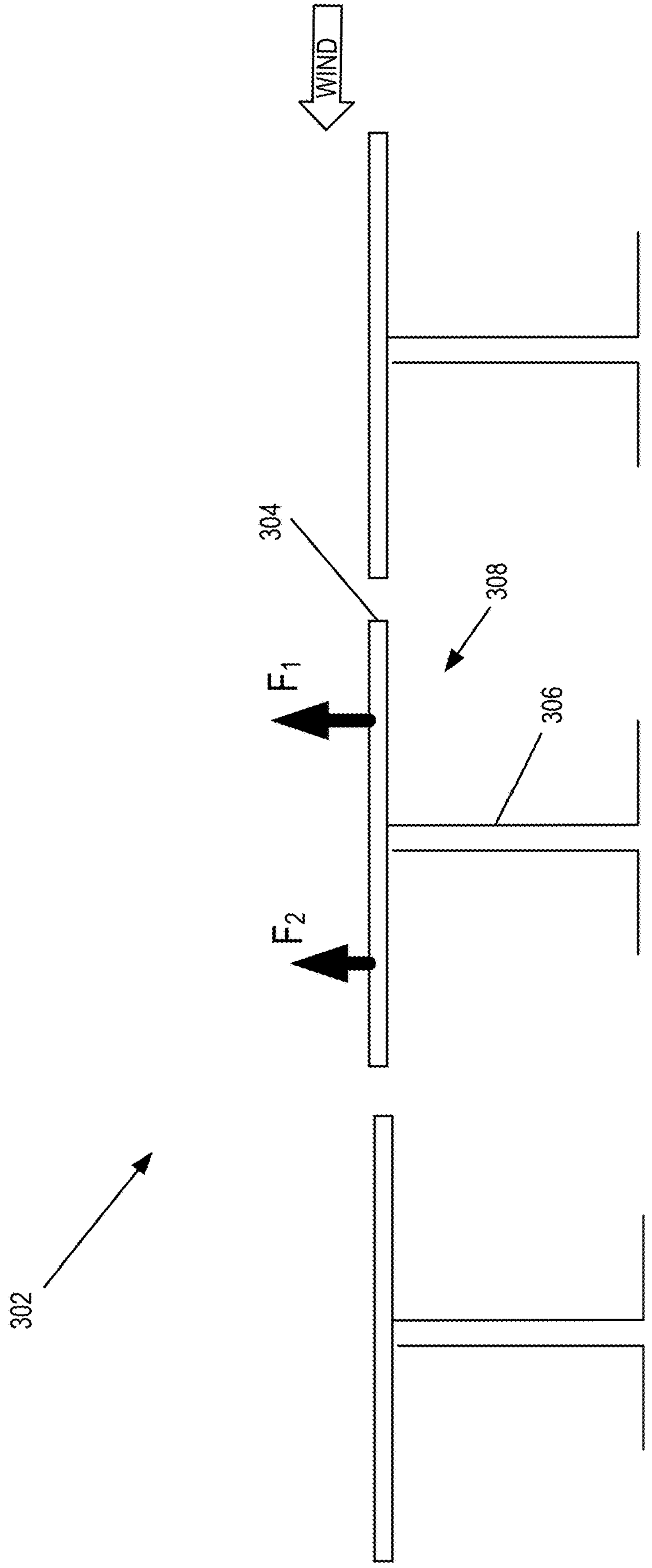
FIG. 3 is a diagram illustrating negative aerodynamic damping of panels at a horizontal tilt.

FIG. 3 is a diagram illustrating negative aerodynamic damping of panels at a horizontal tilt. Depicted is a first row 302 stowed flat/horizontally. Force indicators are applied to either side of a panel 304 about a base 306. The force experienced on either side of the panel 304 is similar, though the force on the windward side 308 is greater. Relenting to the force results in a positive tilt which is depicted in FIG. 2. As described above, relenting to the forces experienced by a positive tilt leads to a greater positive tilt and is thus an unstable configuration.

It is possible to operate the system such that the two aerodynamic factors outlined as combining together with the positive tilt angle case instead operate with one increasing in effect while the other decreases. This requires that the tracker row be stowed at a negative tilt angle. The increased wind exposure at the top of the array now acts to twist the row toward the horizontal instead of away as with the positive tilt angle case. However, the tendency for the center of pressure of wind loading to occur toward the windward side of the row chord still acts to rotate the system away from zero degrees in this configuration. Another key difference is that, with negative tilt angles, the impact of this second factor is reduced by the increased shielding of the lower side of the tracker rows as the row twists away from horizontal whereas it was increased for the positive tilt angle stow case. Flow separation from the windward edge with increased tilt also contributes to reducing this second factor.

Figure 4:
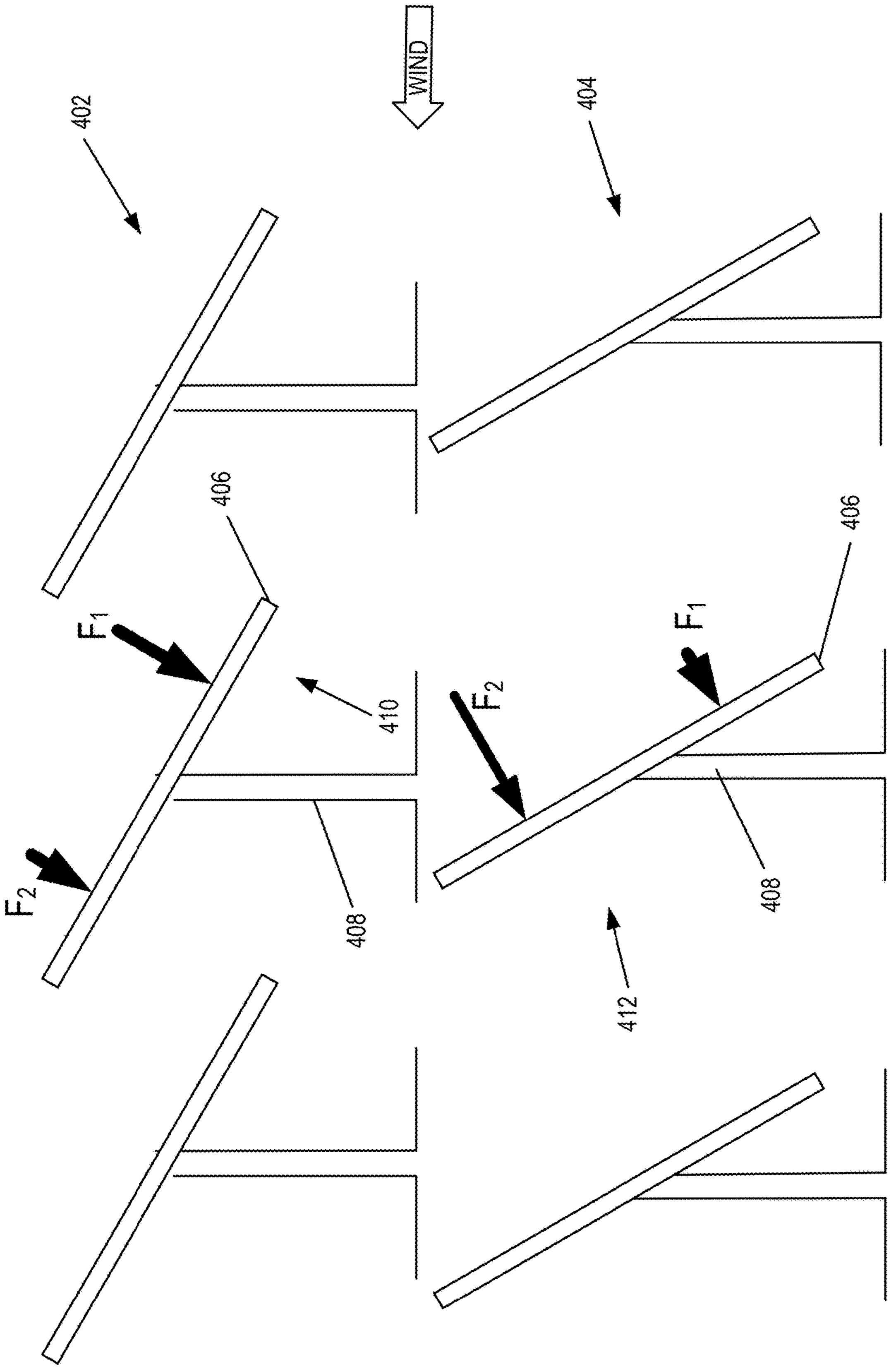
FIG. 4 is a diagram illustrating positive aerodynamic damping of panels with a negative windward tilt angle.

FIG. 4 is a diagram illustrating positive aerodynamic damping of panels with a negative windward tilt angle. Depicted is a row segment 402 at a low negative tilt and the row segment 404 at a high negative tilt. Force indicators are applied to either side of a panel 406 about a base 408. While at a low negative tilt, the windward side 410 experiences the greatest amount of downward force, and relenting to that force (e.g., shifting to a greater negative tilt), shifts the side experiencing the greatest force to the leeward side 412. Relating to the force after the increase in the negative tilt angle lowers the tilt angle. There is thus a balancing effect between the forces shifting between the windward and leeward side based on tilt angle. The balancing effect is referred to as positive aerodynamic damping herein. The testing design techniques described herein seek to identify the range of stow angles that maximize this aerodynamic damping effect.

In the example depicted in FIG. 4 the two aerodynamic factors work in opposition and thus provide a restorative action that yields the positive aerodynamic damping function when the right system design criteria are met. This positive aerodynamic damping can be so effective that a design point where these effects mitigate each other almost completely can be attained. The mitigation is due to the nature of each of these factors where they grow and decline in relative effect with steeper negative tilt angles, respectively. Furthermore, the deflected row shape in this wind stow condition has reduced oscillation during a wind event as principle damping effects are positive, unlike the current practices today.

Positive aerodynamic damping can be realized with stow angles as low as negative five degrees toward the wind, but also applies to steeper stow angles. The two aerodynamic factors remain in opposition over a wide range of negative tilt angles, system stability is benefited over a wide operating range of tilt angles. As these two aerodynamic factors change in relative strength over different negative tilt angles, the tracker structure makes up the difference with the required twist until a new equilibrium is achieved.

In practice, the aerodynamic forces acting on a system are continuously evolving and so the tracker row will rotate in response even if all damping factors are positive. In some circumstances, that rotation response can be shown to be smaller than it would be if aerodynamic damping was negative. This robust design approach also makes the system highly resilient against operating errors or topographical effects of a site, unlike systems today that must constrain row twist within a narrow band to be stable. This eliminates multiple known failure modes in the industry.

While it is possible to design a row for minimal twisting during wind stow with this approach, a moderate twist along the row is actually desirable as the transition between the described aerodynamic factors is smoothed out over the span of the row twist. This is similar to the use of helical strakes on a chimney or the helical blades of a vertical wind turbine. All serve to smooth aerodynamic effects by ensuring that changes in wind loading that occur at a particular tilt angle are not all occurring at the same time along the row. Reducing aerodynamic effects is of importance to system stability as well as serving to reduce fatigue loading on the PV panels on the row. For this reason, one embodiment disclosed herein positions the row actuator at a negative 5 degrees tilt and allow the row ends to rotate down to negative 15 degrees.

Figure 5:
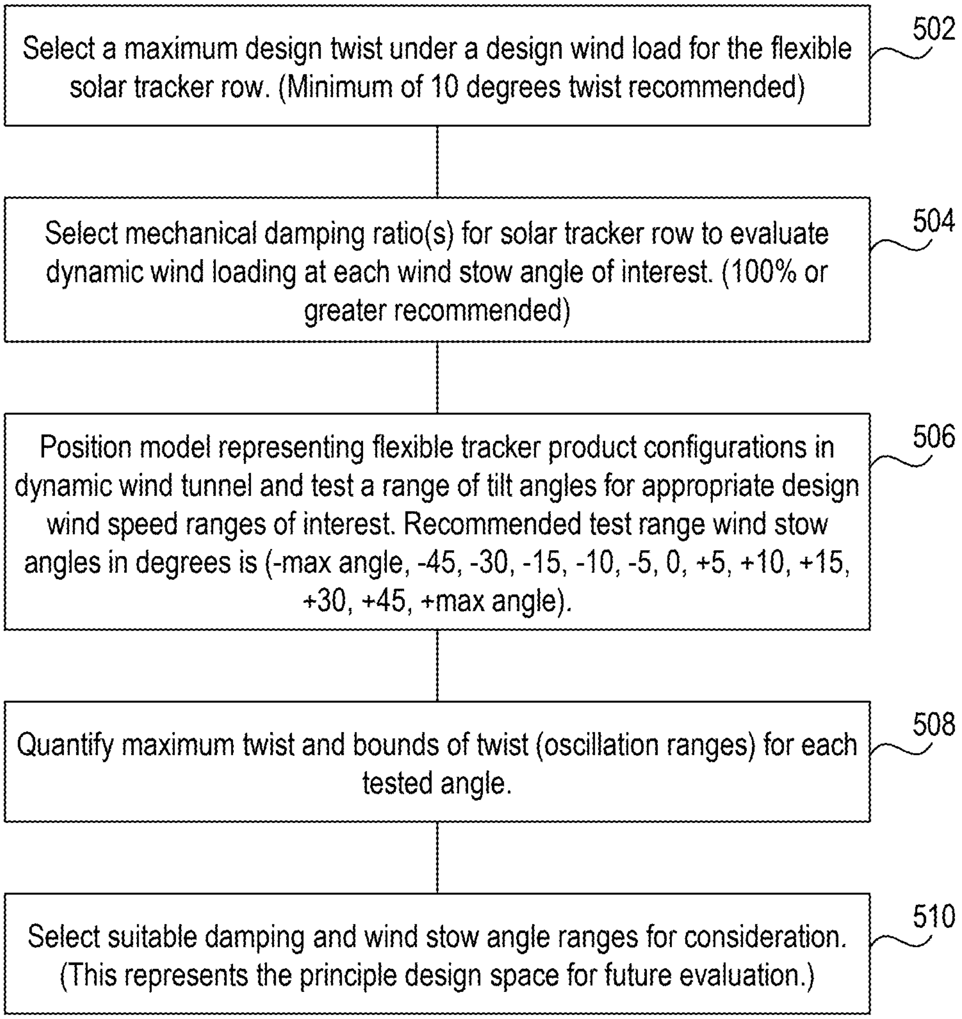
FIG. 5 is a flowchart illustrating a design schema to identify a range of stow angles with positive aerodynamic damping for a given system.

FIG. 5 is a flowchart illustrating a design schema to identify a range of stow angles with positive aerodynamic damping for a given system. The primary requirement to achieve positive aerodynamic damping is to stow the tracker row at a negative tilt angle for high wind. However, this alone is not sufficient and does not guarantee positive aerodynamic damping. It is also critical that the tracker row have an appropriate designed twist angle and mechanical damping ratio. The process for designing a tracker row for positive aerodynamic damping function and high total damping at lower than maximum tilt angles is as follows:

In step 502, a designer determines a target twist of a tracker row when wind stowed. Embodiments of step 502 are performed for an anticipated final wind stow angle, but it is recommended to do this for zero degrees tilt in order to allow the flexibility to transition the tracker from facing one direction to the other if the approaching wind direction changes. In some embodiments, the target twist angle is selected through several methods and calculated analytically.

A significant challenge is in attaining representative wind loading early in the design process. Wind loading can be estimated to the first order by static wind tunnel testing, computational fluid dynamics ("CFD"), or inferred from previous design experience of trackers. This twist angle lacks dynamic wind inputs at this stage and this factor would previously risk turning the design into a timely, expensive, and iterative process. However, that will be addressed through step 504. Too little twist is counter-productive with this design approach and so ten degrees of twist is recommended as a design target. More may be appropriate for longer rows or different design goals.

Step 504 is to determine representative testing mechanical damping ratios. Mechanical damping is still necessary to prevent unacceptable oscillations at negative tilt angles, but once positive aerodynamic damping is achieved, less mechanical damping is required to achieve a stable tracker design than would be required for the same tracker stowed at the corresponding positive tilt angle. This mechanical damping ratio of a tracker system can be determined from deflecting a tracker row from the intended stow angle by the total twist targeted for the end design (ten degrees in this example) and measuring system response through pluck testing, motion analysis, or any other suitable method as practiced by the industry today.

The underlying reason for requiring mechanical damping is that the aerodynamic effects that work in opposition to positive aerodynamic damping are not themselves completely smooth functions due to the high turbulence within the tracker and other non-linear aeroelastic effects operating on the system. A damping ratio of 25% of critical damping as provided by mechanical damping is sufficient in most cases to achieve a stable tracker design at some negative stow angles below maximum tilt, however damping ratios of 100% of critical damping or greater will be shown to allow better performance at lower magnitudes of wind stow angle and are recommended.

Steps 502 and 504 concern defining the system to undergo testing. Step 502 refers to design twist and 504 to mechanical damping; however, there are many other factors/components that influence these. Determining these factors/components is an additional step performed in some embodiments. Examples include determining any of: post span distances; component sections size; oscillation range; torque tube torsion constant; torque tube thickness; or whether a given tracker row is an interior row or an exterior row.

Ultimately, design of a PV tracker system is an iterative process, and one would conduct varied dynamic wind tunnel tests at the plurality of stow angles having each varied the predetermined design specifications (e.g., including varying the factors/components described above). Across multiple tests, the method includes determining a corresponding range of stow angles to each respective varied dynamic wind tunnel test and configuring the flexible solar tracker system with the predetermined design specifications based on measured system stability as compared to a system cost. One seeks to maximize or balance certain predetermined design priorities with other priorities (e.g., system cost balanced with measured system stability).

Step 506 includes configuring a dynamic wind tunnel test of a representative flexible tracker system under predetermined design specifications including a maximum design twist of a flexible tracker row and a mechanical damping ratio. Step 506 is testing the prototype tracker row for the selected design twist and selected damping ratio(s) for torsional motion with a method that evaluates dynamic wind loading. An appropriate method of evaluating total torsional damping as specified by current building codes is the use of dynamic wind tunnel testing at an appropriate boundary-layer wind tunnel facility. Several reputable firms currently serve the solar racking industry and are capable of evaluating the methods outlined here. Testing methods isolate wind directionality such that negative and positive wind stow angles can be evaluated in isolation. It is recommended that test models are preconfigured such that multiple mechanical damping ratios can be evaluated in succession as this is the primary variable that will be used to evaluate the tracker rows for each predetermined wind stow angle.

Step 508 is conducting the dynamic wind tunnel test at a plurality of stow angles (e.g., 0, and positive and negative 5, 10, 15, 30, 45, and 60 degrees) according to the test configuration described above. In some embodiments, the dynamic wind tunnel test is performed on a true to life system model or alternatively a scale model of the flexible solar tracker system. Results of the test enable quantification of maximum twist and bounds of twist (e.g., oscillation range) for each tested stow angle. See FIGS. 6A and 6B as examples of a format of key outputs from this wind tunnel testing for a representative 10%, 15%, 25%, and 100% damping ratio test system. The data presented in the curves is representative but not reflective of every flexible PV tracker system. Each system should be individually tested (e.g., according to the method of FIG. 5) and decisions based on tuning of that system should be made based on the resultant data that corresponds with that exact system.

Figure 6A:
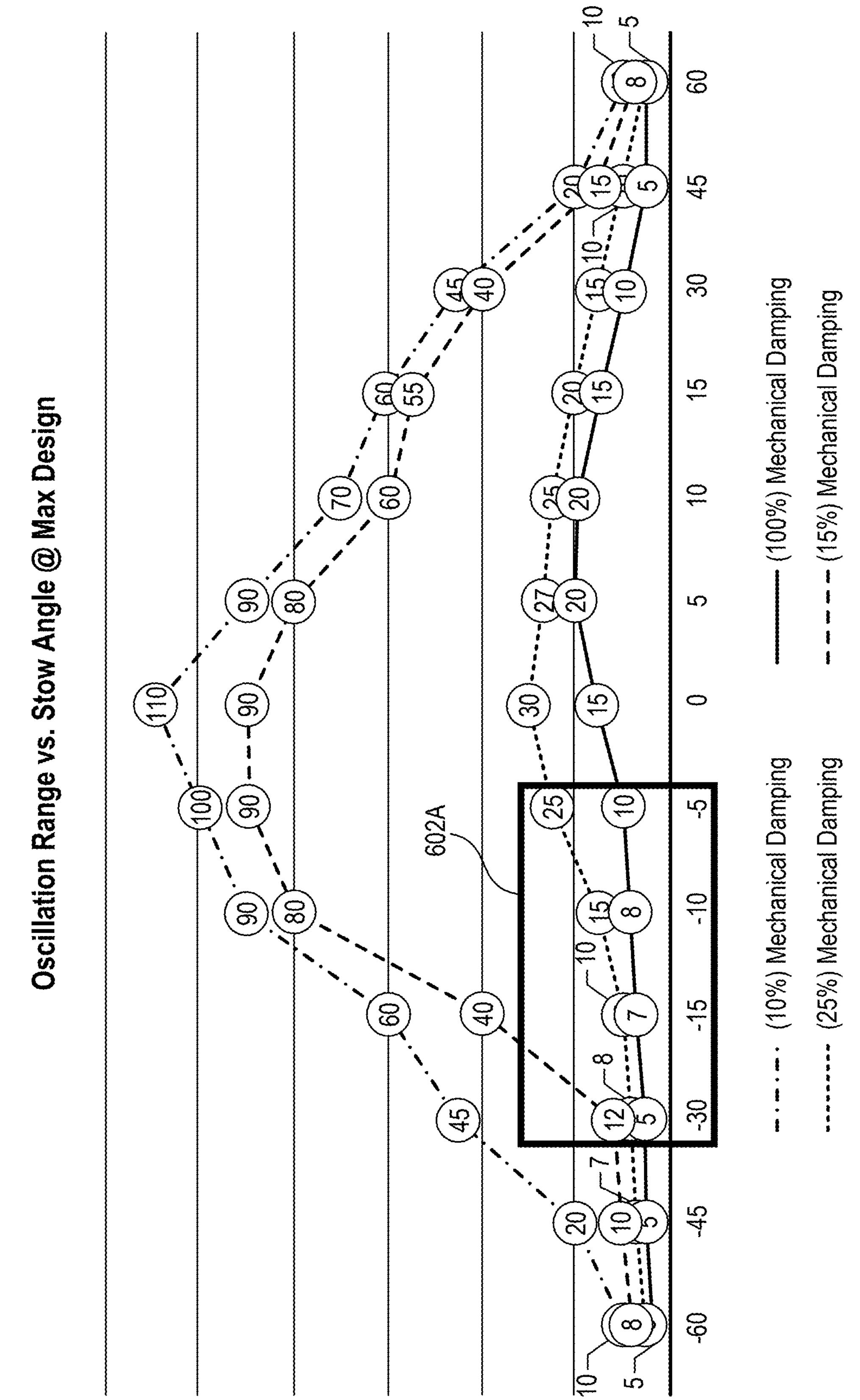
FIG. 6A is a graph of a sample illustrative system illustrating results of a wind tunnel test measuring oscillation at various stow angles and strength of damping.
Figure 6B:
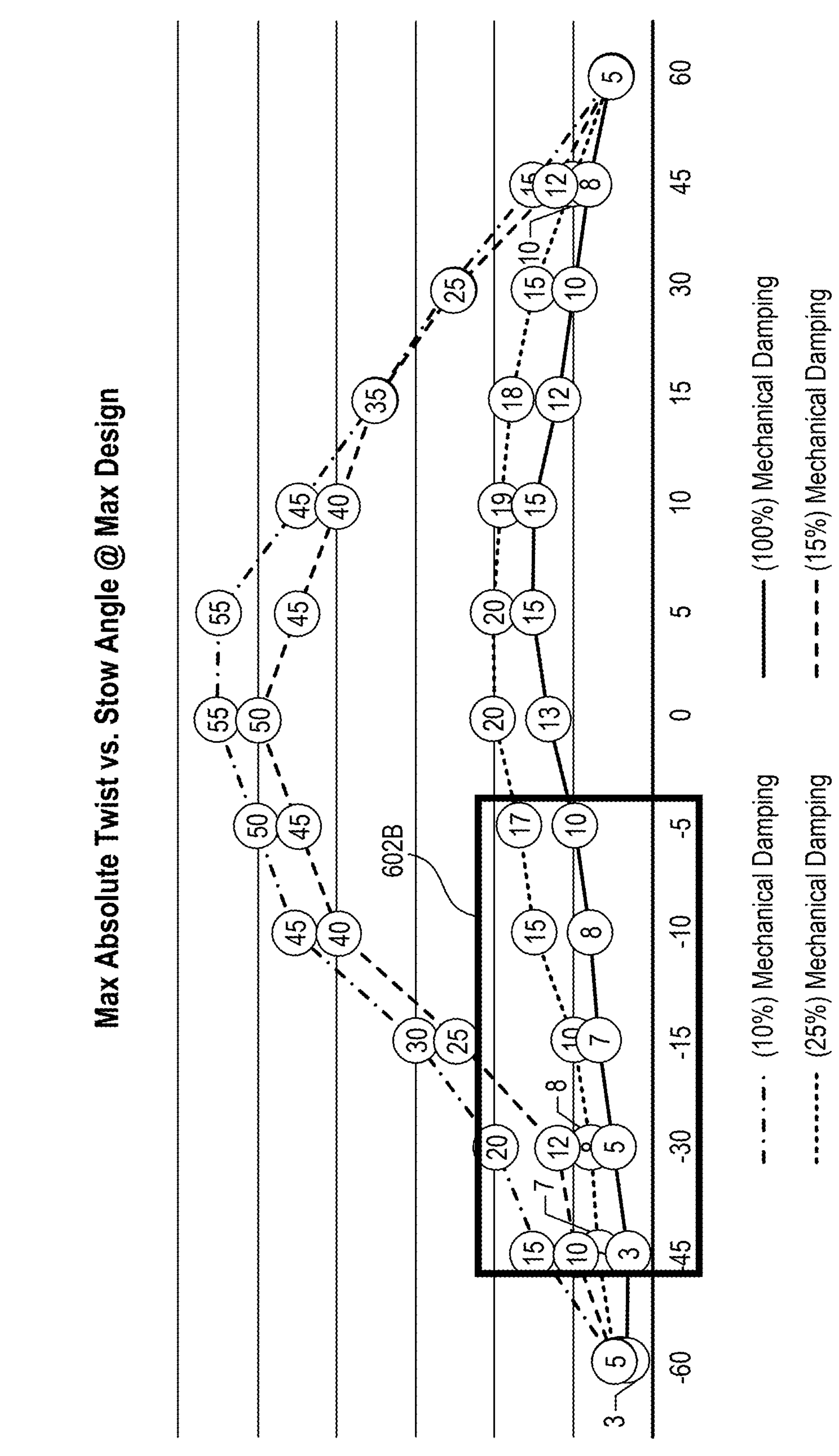
FIG. 6B is a graph of a sample illustrative system illustrating results of a wind tunnel test measuring max twist at various stow angles and strength of damping.

However, while the curves are merely representative, the trends present in the data exist from system to system, and those trends are effective at guiding tracking system tuning and design. FIG. 6A shows the range of maximum and minimum tilts measured at the greatest twist. FIG. 6B shows the maximum twist of the test row as a function of stow angle (simplified here for illustration, but always away from zero degrees in this sample case). The 10% mechanical damping test system represented here exhibits significant negative aerodynamic damping over all tilts with a reduction at plus or minus maximum tilt.

This example is well reflected in the industry and graphically demonstrates the torsional galloping that has caused significant failures under high wind. The 10% damping ratio case has little to no torsional stability at all stow angles other than maximum tilt angles and must be stowed there as is typically done. The systems represented by the 15%, 25%, and 100% mechanical damping will be evaluated further in the next step.

Step 510 comprises evaluating the data presented in FIGS. 6A and 6B to identify when total damping includes positive aerodynamic damping. Based on a result of the dynamic wind tunnel test, the method includes determining a range of stow angles corresponding to a negative tilt that results in a reduced measured maximum twist as compared to a corresponding positive tilt angle.

The range of stow angles are identifiable through comparing corresponding positive and negative stow angles within each chart and by comparing the same stow angles between charts. Positive aerodynamic damping for a given mechanical damping ratio principally requires that the oscillation range not be meaningfully higher than the maximum absolute twist for the same stow angle. This relationship makes sense as maximum absolute twist is by definition the maximum deviation of the oscillation around a given stow angle. For this reason, oscillation range as measured by tunnel testing cannot be lower than maximum stow angle, but this does not indicate actual repeated torsional oscillations.

Therefore, it is recommended to use video recording or real-time measurement of row twist to detect oscillations and further understand system stability. For example, at positive 10 degrees stow angle, all mechanical damping ratio tests show oscillation ranges higher than maximum absolute twist. None of these designs show positive aerodynamic damping as oscillation ranges extend on both sides of the tracker row stow angle and they should be disregarded for further consideration. However, the 15%, 25%, and 100% mechanical damping ratio cases show oscillations no higher than maximum twist at negative stow angles between −30 to −60 (15% damping), −10 to −60 (25% damping), and −5 to −60 (100% damping). These ranges represent the design space for further evaluation.

The same magnitude positive and negative stow angles should also be compared for both figures. This can also indicate positive aerodynamic damping, particularly at low absolute tilt angles within ten degrees of flat stow. At both 25% and 100% mechanical damping configurations, the graphs depicted in FIGS. 6A and 6B illustrate ranges of stow angles for which positive aerodynamic damping occurs. The curve is not symmetrical and there are negative tilts for which the corresponding positive tilt has a noticeably greater twist or oscillation range. There is a region, as labeled 602A and 602B in the figures respectively, that is indicative from system to system for the stow angles for which one should expect to experience positive aerodynamic damping, particularly at low absolute tilt angles within ten degrees of flat stow. The region 602A, 602B will not necessarily be the exact same for each system but is identified in a similar manner.

For example, the 100% mechanical damping test shows a significant reduction in oscillation range between +5 and −5, while the other test configurations do not. This indicates positive aerodynamic damping in that configuration. Finally, significant reductions in maximum absolute twist with steeper negative angles indicate a transition from negative to positive aerodynamic damping. Again, the 100% mechanical damping test configuration shows this change as it goes from 0 to −5 degrees. However, that does not occur for the 25% test case until −10 degrees or the 15% test case until −30 degrees.

Notably, the region 602A, 602B extends to greater negative tilts than is preferrable based on other considerations relating to transferring force to the base/pile. Accordingly, much of the value of taking advantage of positive aerodynamic damping it achieved by employing the lower tilts within the region 602A, 602B.

Of the 25% and 100% mechanical damping options, the cost of increasing mechanical damping from 25% to 100% is a simple measure to weigh against the relevant impacts of stowing at −15 and −5 degrees. A common configuration of these trackers uses a torque tube that torsionally connects all PV modules together and carries torque along the row as well as supports the panels against normal environmental loading between foundations. A typical outcome of optimizing a system such as this is that the torque tubes are loaded to approximately 50% of capacity from torsion and 50% of capacity from supporting normal bending loads. The reduction in torsional loading is represented well by the reduction in maximum twisting in FIG. 6B.

For example, moving from the 25% damping case of −10 degrees wind stow to the 100% damping case of −5 degrees wind stow reduces maximum row twist from 15 to 10 degrees. This corresponds to a ⅓ reduction in torsional loading and a theoretical ⅙ reduction in overall steel. However, this change also reduces the maximum tilt angle that the row will see from −25 degrees to −15 degrees and this reduces normal bending loading on the row as well as foundation loading. From this, it can be seen that the reduction in torque tube steel of this system will be higher than just from torsional effects alone. This evaluation can be done for any cases on FIG. 4 and a skilled tracker designer can further optimize by increasing or decreasing spans between foundation supports as well through iterative design or parametric analysis.

Adaptive Stow

Above testing and design techniques are described to advantageously make use of negative tilts during stow. The wind famously changes direction; thus, at one point, what was once a negative tilt could become a positive tilt. In response to this shift, a tracker system that employs adaptive stow techniques enables the system to maintain negative tilts.

Figure 7A:
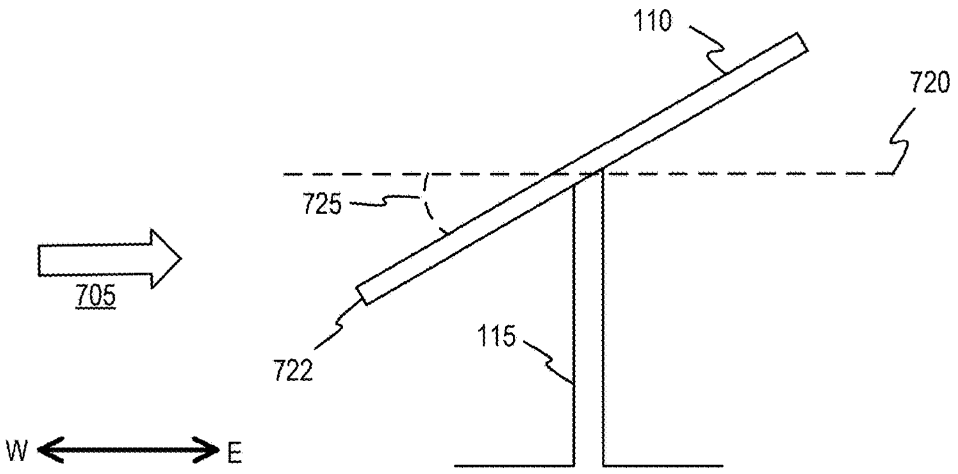
FIGS. 7A-7C illustrate example adaptive stow positions of a photovoltaic panel.

FIGS. 7A-2C illustrate example adaptive stow positions selected by the controller 130 based on angle of wind incident on the PV panel 110. Generally, the controller 130 can cause the PV panel 110 to be stowed at an angle such that a leading edge of the PV panel 110 is angled downward into a wind direction when the wind is incident on the panel 110 from specified ranges of angles. For example, when the PV system 100 rotates the panel 110 around an axis from predominantly facing eastward to predominantly facing westward, the controller 130 can set a stow angle of the PV panel 110 into the wind when the wind is incident from a predominantly eastward or westward direction.

Figure 7B:
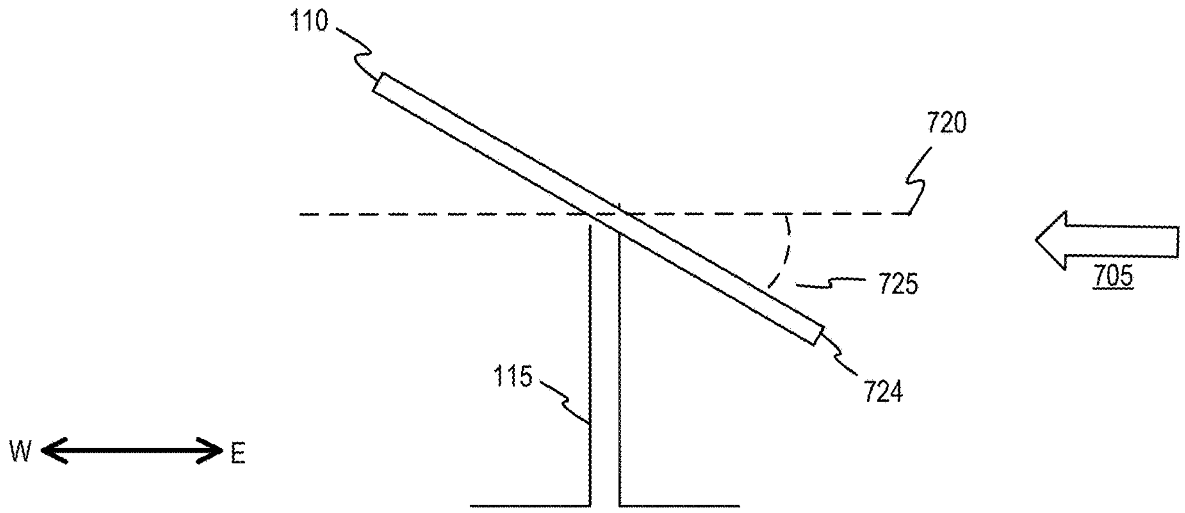
Figure 7C:
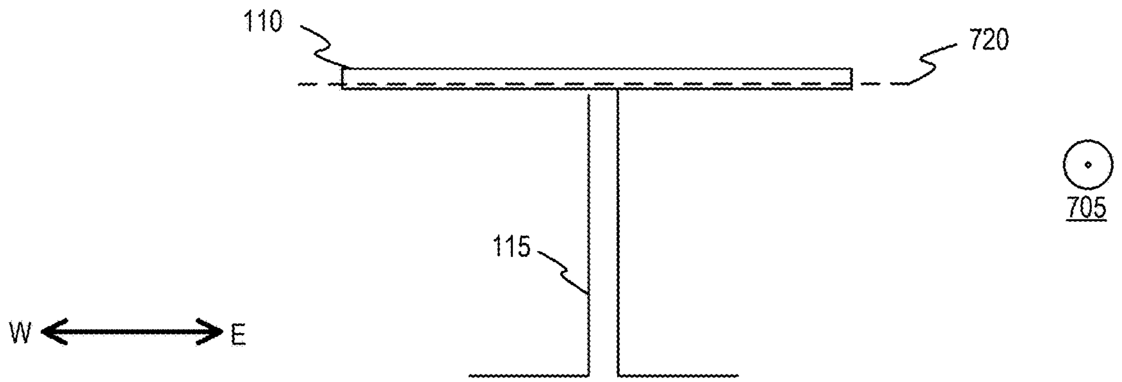

Specifically, in FIG. 7A, a wind direction 705 incident on the panel 110 is direction that is predominantly from the west. In this case, the controller 130 causes the actuator 120 to rotate the PV panel 110 such that a west-facing, leading edge 722 of the panel 110 is angled downward, at an angle 725, below a horizontal axis 720. Similarly, as shown in FIG. 7C, the wind direction 705 is a direction that is predominantly from the east. In this case, the controller 130 causes the actuator 120 to rotate the PV panel 110 such that the east-facing, leading edge 724 of the panel 110 is angled downward at the angle 725 below the horizontal axis 720. The angle 725 can be, for example, between approximately −5° and approximately −20°, such as approximately −15°. In FIGS. 7A and 7B, the horizontal axis 720 can be defined in some implementations as an axis that is substantially parallel to the PV panel 110 when the panel is at rotational midpoint between the PV panel's most eastward-facing angle and its most westward facing angle. Depending on a variety of factors such as the geography of the area where the PV panel 110 is installed, surface topology (e.g., whether the ground is relatively flat or hilly), and wind patterns in the area, the horizontal axis 720 may be substantially parallel to the wind direction, substantially parallel to the ground, or both. Other implementations may instead define the horizontal axis 720 as an axis that is substantially parallel to the ground or the wind direction. The horizontal axis 720 can defined for each PV panel 110 based on the specific geography, surface topology, or wind patterns of the area where the PV panel 110 is installed.

If the wind direction 705 is instead incident on the PV panel 110 from a predominantly northward or southward direction, the controller 130 can select a different stow position or a stow position that is the same as the stow position when the wind originates predominantly from the east or predominantly from the west. For example, FIG. 7C illustrates that when the wind direction 705 is incident from the panel from the north, the controller 130 can cause the actuator 120 to stow the PV panel 110 at an angle that is substantially parallel to the horizontal axis 720.

The panels are configured to stow toward the direction of the oncoming wind flow. Given that the panels operate on a single axis tracker system, the term "toward" is defined with acknowledgment given to the single axis nature of rotation. Where the single axis is aligned to enable the panel to pivot to face east or west, positioning toward the wind is a matter of determining whether the wind flow is arriving from a direction that is more west than it is east, or vice versa. In a given example where the predominant direction of the wind is from the south, but because the wind is more westerly than easterly, tipping the panel to the west is still "toward" the wind flow.

In some embodiments, the panels are stowed at a flat or parallel to the ground angle in response to certain winds. For example, where the single axis of rotation enables an east-west rotation, a range of angles of wind arriving from predominantly southerly or northerly directions correspond to the flat or parallel stow angle.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A method of determining stow angles with positive aerodynamic damping associated with a flexible solar tracker system comprising:
- configuring a dynamic wind tunnel test of a representative flexible tracker system under predetermined design specifications including a maximum design twist of a flexible tracker row and a mechanical damping ratio;
- conducting the dynamic wind tunnel test at a plurality of stow angles;
- based on a result of the dynamic wind tunnel test, determining a range of stow angles corresponding to a negative tilt that results in a reduced measured maximum twist as compared to a corresponding positive tilt angle; and
- configuring the flexible solar tracker system with a stow angle within the range of stow angles.

2. The method of claim 1, wherein said predetermined design specifications further include any of:
- post spans;
- component sections;
- oscillation range;
- torque tube torsion constant;
- torque tube thickness; or
- whether a given tracker row is an interior row or an exterior row.

3. The method of claim 1, further comprising:
- conducting varied dynamic wind tunnel tests at the plurality of stow angles having each varied the predetermined design specifications;
- determining a corresponding range of stow angles to each respective varied dynamic wind tunnel test; and
- configuring the flexible solar tracker system with the predetermined design specifications based on measured system stability as compared to a system cost.

4. The method of claim 1, wherein the range of stow angles and the stow angle within the range of stow angles is variable based on a wind direction.

5. The method of claim 4, wherein the variability in the range of stow angles and the stow angle within the range of stow angles is mirrored across opposite wind directions.

6. The method of claim 1, wherein the representative flexible tracker system is a scale model of the flexible solar tracker system.

7. The method of claim 1, wherein the flexible solar tracker system is further configured wherein the maximum design twist of the flexible tracker row is based on passing through horizontal during a stow setting to adapt to shifting wind directions.

8. The method of claim 1, further comprising:
- detecting a wind flow oncoming to the flexible solar tracker system; and
- stowing the flexible solar tracker system at the stow angle within the range of stow angles.

9. A method of stowing a flexible solar tracker system at angles with positive aerodynamic damping comprising:

configuring the flexible solar tracker system with a stow angle within a range of stow angles based on a dynamic wind tunnel test of a representative flexible tracker system under predetermined design specifications including a maximum design twist of a flexible tracker row and a mechanical damping ratio, wherein the range of stow angles corresponds to a negative tilt that results in a reduced measured maximum twist as compared to a corresponding positive tilt angle;

detecting a wind flow oncoming to the flexible solar tracker system; and stowing the flexible solar tracker system at the stow angle within the range of stow angles.

10. The method of claim 9, wherein said predetermined design specifications further include any of:

post spans;

component sections;

oscillation range;

torque tube torsion constant;

torque tube thickness; or whether a given tracker row is an interior row or an exterior row.

11. The method of claim 9, further comprising:

configuring the dynamic wind tunnel test of the representative flexible tracker system under the predetermined design specifications including the maximum design twist of the flexible tracker row and the mechanical damping ratio;

conducting the dynamic wind tunnel test at a plurality of stow angles; and based on a result of the dynamic wind tunnel test, determining the range of stow angles corresponding to the negative tilt that results in the reduced measured maximum twist as compared to the corresponding positive tilt angle.

12. The method of claim 11, further comprising:

conducting varied dynamic wind tunnel tests at the plurality of stow angles having each varied the predetermined design specifications;

determining a corresponding range of stow angles to each respective varied dynamic wind tunnel test; and configuring the flexible solar tracker system with the predetermined design specifications based on measured system stability as compared to a system cost.

13. The method of claim 9, wherein the range of stow angles and the stow angle within the range of stow angles is variable based on a wind direction.

14. The method of claim 13, wherein the variability in the range of stow angles and the stow angle within the range of stow angles is mirrored across opposite wind directions.

15. The method of claim 9, wherein the representative flexible tracker system is a scale model of the flexible solar tracker system.

16. The method of claim 9, wherein the flexible solar tracker system is further configured wherein the maximum design twist of the flexible tracker row is based on passing through horizontal during a stow setting to adapt to shifting wind directions.

17. A system of stowing a flexible solar tracker system at angles with positive aerodynamic damping, the flexible solar tracker system having particular a maximum design twist of a flexible tracker row and a mechanical damping ratio, the system further comprising:

an actuator that sets an angle of the flexible solar tracker system; and a controller including instructions that when executed cause the actuator to set the flexible solar tracker system to a stow angle within a range of stow angles based on a dynamic wind tunnel test of a representative flexible tracker system under predetermined design specifications including the maximum design twist of the flexible tracker row and the mechanical damping ratio, wherein the range of stow angles corresponds to a negative tilt that results in a reduced measured maximum twist as compared to a corresponding positive tilt angle.

18. The system of claim 17, further comprising:

a windspeed sensor configured to detect environmental events experienced by a photovoltaic array operated by the flexible solar tracker system, the windspeed sensor communicatively coupled to the controller.

19. The system of claim 17, wherein the range of stow angles and the stow angle within the range of stow angles is variable based on a wind direction.

20. The system of claim 17, wherein the flexible solar tracker system further has particular:

post spans;

component sections;

oscillation range;

torque tube torsion constant; and torque tube thickness.

* * * * *